Oct. 21, 1947. C. B. KAMISS 2,429,358
FILM PROCESSING CLAMP
Filed Jan. 6, 1947 2 Sheets-Sheet 1
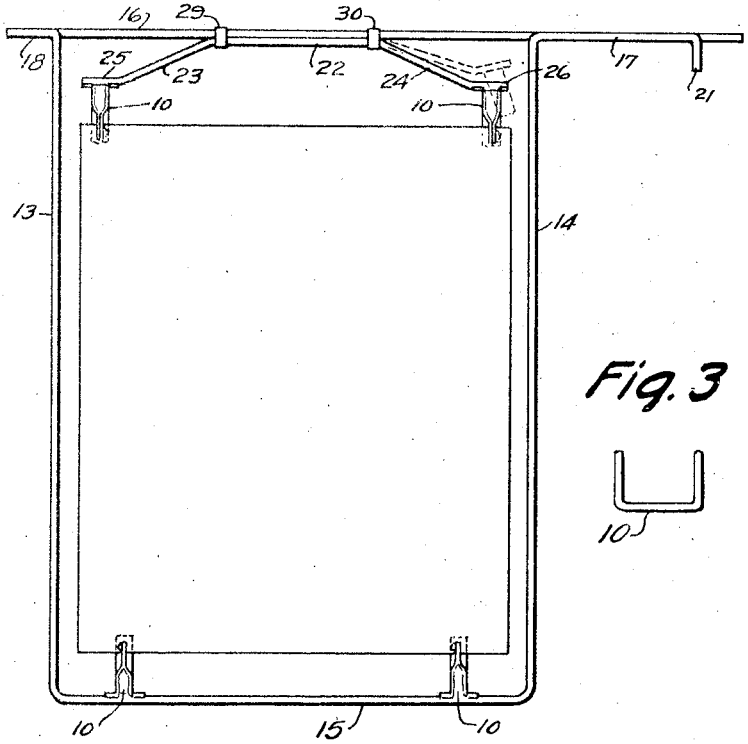
INVENTOR
CHARLES B. KAMISS
James Harrison Bowen
HIS ATTORNEY Oct. 21, 1947.  C. B. KAMISS  2,429,358
FILM PROCESSING CLAMP
Filed Jan. 6, 1947  2 Sheets-Sheet 2

INVENTOR
CHARLES B. KAMISS
James Harrison Bowen
HIS ATTORNEY

Patented Oct. 21, 1947

2,429,358

UNITED STATES PATENT OFFICE 2,429,358

FILM PROCESSING CLAMP

Charles B. Kamiss, Jamaica, N. Y.

Application January 6, 1947, Serial No. 720,355

1 Claim. (Cl. 24—252)

This invention relates to devices for holding photographic film in the process of developing, fixing, washing, and drying wherein the film is held in tension in a frame of wire or the like, and in particular a clip for readily and positively gripping the edges of the film and by which the film is suspended in tension in a holder or frame.

Photographic and X-ray films, particularly flat films, are difficult to handle as they are coated with an emulsion that is easily damaged, and with this thought in mind this invention contemplates an improved film holder with gripping clips having film receiving slots with outwardly flared ends to facilitate inserting a film therein, and readily releasable gripping jaws in which increased tension on the film increases the gripping action.

The purpose of this invention is to provide an improved film holding clip for suspending films in frames in which the edge of the film may readily be slipped into the clip and in which the film may readily be released by a slight pressure on an element on the outer surface of the clip.

Films are inserted in holders of this type in the dark or with very dim light, and in general developing they remain in the holder throughout the different stages of developing, fixing, washing, and drying, and this requires continuous handling. For this reason the film should be held with a positive grip, and to accomplish this end the improved clip of this invention includes a cam acting gripping jaw in which pull on the film actuates the jaw to more positive gripping relation with the film.

The object of this invention is, therefore, to provide a film gripping clip that may readily be applied to film holding frames into which the film may readily be clamped and in which, once the film is in place in the clip, it is positively held until manually released.

Another object of the invention is to provide a film holding clip that may be used in combination with film holding frames of different types.

Another object of the invention is to provide a film gripping clip that may be readily mounted on a film holding frame.

Another object of the invention is to provide a film gripping clip that may readily be attached to and mounted upon a film holding frame.

A further object of the invention is to provide a positive gripping film holding clip into which a film may readily be inserted which is of a simple and economical construction.

With these and other objects in view the invention embodies a clip having a channel shaped frame with a film receiving slot extending inward against the back from one end and with the end of the back adjacent the slot flared outward, a cam acting gripping element pivotally mounted between the sides, and a spring urging the cam acting element in gripping relation with the inner surface of the back.

Other features and advantages of the invention will appear from the following description taken in connection with the drawings, wherein:

Figure 1 is a view illustrating an adjustable film holding frame showing a flat film held in suspension thereon by the improved clips.

Figure 2 is a detail showing an end view of the frame.

Figure 3 is an end view of the channel shaped base of the clamp shown in Figure 4, with other parts omitted.

Figure 4 is a view showing one of the film holding clips with a corner of a film held therein and with the mounting elements omitted from the upper end thereof.

Figure 5 is a plan view of one of the film holding clips on an enlarged scale.

Figure 6 is a longitudinal section through the clip taken on line 6—6 of Figure 5.

Figure 7 is a view looking toward the back of the clip shown in Figure 5 showing an opening in the back to facilitate washing out chemicals and the like trapped under the spring and illustrating a modification wherein the mounting elements at the upper end of the clip are omitted.

Figure 8:
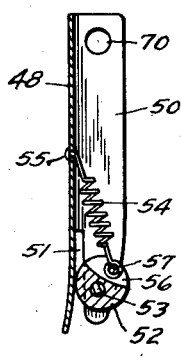
Figure 8 is a view taken on line 8—8 of Figure 9 showing a longitudinal section through a clip including a further modification wherein the cam gripping element is in the form of a roller eccentrically mounted in the clip and held by a spring.
Figure 9:
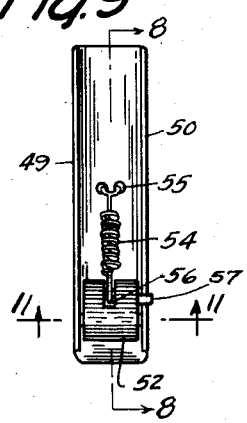
Figure 9 is a front elevation of the clip illustrated in Figure 8.

Referring now to the drawings wherein like reference characters indicate corresponding parts the film frame clip of this invention includes a channel shaped base 10, a cam 11 providing a gripping element, and a spring 12, and in the design shown the clip is illustrated in combination with a frame formed with side members 13 and 14, a cross member 15, and a supporting bar 16.

The frame of this design is U-shaped and the upper ends 17 and 18 of the sides are bent outwardly and spot welded to the support 16 at the points 19 and 20, and the outer end 21 of the end 17 is bent downward as shown. The frame is provided with a spring bar 22 having downwardly sloping ends 23 and 24 and outwardly extending ends 25 and 26 at the upper ends of the sides of the clips or clamps 10 are spot welded to straight portions 27 and 28 at the ends thereof. The spring bar 22 is secured to the support 16 by bands 29 and 30 extending around the support bar and spring, and the sides of the bands are staked inward points between the bar and spring to rigidly hold the spring to the bar.

Devices of this type that hold the corners or edges of film are generally referred to as clips, however the film processing clamp of this invention utilizes a cam action which positively clamps or even locks the film in the holding device, and gripping the film in this manner makes it possible to positively hold the film without marring, piercing, or damaging the film, and also eliminates the necessity of cutting the corners of the film, which is now customary.

The clip illustrated in Figures 4 to 7 inclusive is channel shape in cross section, having sides 35 and 36 which slope inward as shown in Figure 5 from a point 37 to the point 38, and the cam 11 is pivotally mounted between the sides on a pin 39. The outer edge of the cam is provided with an extending platform 40 by which it may be pressed inward, and the inner end 41 is held downward by the spring 12. The inner edge of the cam 11 is formed with gripping teeth 42 as shown in Figure 6 and as a film is pressed into a slot 43 provided under the edges of the sides the cam may be raised against the spring and once the film is in place it will be noted that a pull on the film will cause the teeth 42 to bite into the surface of the film thereby accentuating the gripping action of the clip. The lower end 44 of the base is flared outward as shown in Figure 6 to facilitate inserting film in the slot and the spring is attached to the upper part of the base by a rivet 45 as shown. In the design shown in Figures 5 and 7 the base is provided with an opening 46 through which the clip may be attached to holding elements.

Figure 10:
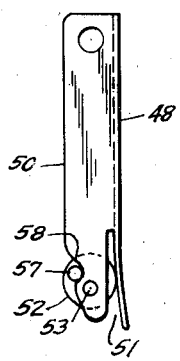
Figure 10 is a side elevation of the clip shown in Figures 8 and 9.
Figure 11:
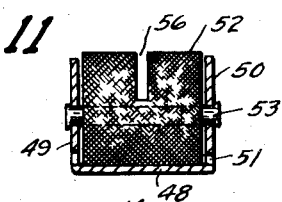
Figure 11 is a further enlarged cross section through the clip shown in Figure 9 taken on line 11—11 thereof illustrating a roller with a different type of knurling thereon and showing the roller turned through an angle of 90° to show the slot therein.

In the design shown in Figures 8 to 11 inclusive, the clip is also formed with a channel shaped base 48 having sides 49 and 50 with a film receiving slot 51, and in the clip of this design a film is gripped by a knurled roller 52 eccentrically mounted between the sides on a pin 53, and the roller is urged in the gripping position shown in Figure 8 by a spring 54, one end of which is attached to the base at the point 55, and the other to the roller. The end of the spring extends into a slot 56 in the roller and is held on a pin 57, one end of which extends outward into a notch 58 in the side 50 to provide a stop as shown in Figure 10.

Figure 12:
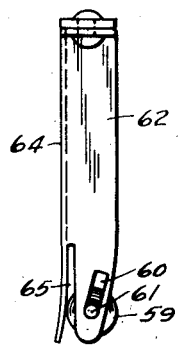
Figure 12 is a side elevation of a clip including a further modification wherein the cam gripping element is provided with a roller mounted in an angularly positioned slot in each side of the clip.
Figure 13:
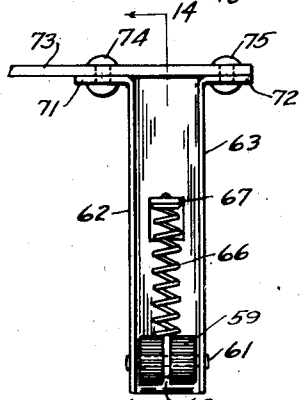
Figure 13 shows a front elevation of the clip shown in Figure 12 showing a further modification wherein the upper ends of the sides of the clip are riveted to a flat bar.
Figure 14:
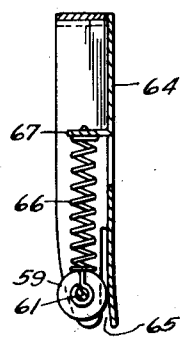
Figure 14 is a longitudinal section through the clip shown in Figures 12 and 13 taken on line 14—14 of Figure 13.

In the clip illustrated in Figures 12 to 14 a knurled roller 59 is rotatably mounted in sloping slots 60 through a pin 61, the slots being positioned in sides 62 and 63 of a base 64. This clip is also provided with a film receiving slot 65 and the roller is urged toward the end of the slots by a spring 66 positioned in compression between a clip 67 and the surface of the roller with the end of the spring held on the pin 61 in a slot 68 in the roller. The clip shown in Figure 8 is provided with openings 70 in the sides by which the clip may be held on a film holding frame or the like.

It will be understood that the clip or clamp of this invention may be placed on the frame or permanently attached thereto, and it may be spot welded to the frame as shown in Figures 5 and 6 or it may also be riveted as shown in Figures 12 and 13. In Figures 12 and 13 the upper ends of the sides are provided with flanges 71 and 72 which are held to the frame, support bar or spring as indicated by the numeral 73 by rivets 74 and 75.

The film processing clamp of this invention, therefore, includes a channel shaped base with a film receiving slot in the lower edges of the sides against the back with the end of the back flared outward and with a cam or gripping element mounted in the sides associated with the slot and urged to gripping relation with the edge of a film inserted in the slot, and in which the cam or gripping element is so positioned that the greater the strain on the film, the greater is the gripping action.

With a clip of this design the edge of a film may readily be inserted in the slot and in the design shown in Figure 4 the gripping element may be released by pressing on the platform 40, whereas in the designs shown in Figures 8 to 14 the knurled roller may be turned or drawn backward by the thumb or finger of an operator.

Whereas the parts are illustrated in the preferred designs it will be understood that modifications may be made in the design or arrangement of the parts without departing from the spirit of the invention.

What is claimed is:

In a film clamp, the combination, which comprises, an elongated channel shaped base having a back and sides with film receiving slots extending inward from one end positioned at the intersection of the sides with the back and with the back flared backward from a point substantially corresponding with the inner ends of the slots, said sides extending diagonally inward toward the center from the inner ends of the slots with the extreme ends of the sides parallel and in spaced relation, a flat cam with a laterally positioned platform on the outer edge positioned between the said spaced parallel ends of the sides, a pin pivotally mounting the cam between the said ends of the sides, said cam having gripping teeth on the inner edge spaced from the center of the pin and having an extending toe projecting beyond the teeth, and a spring attached to the back of the clamp projecting over the toe of the cam urging the said teeth toward the back of the clamp and into gripping relation with the edge of a film positioned in the said slots.

CHARLES B. KAMISS.

REFERENCES CITED

The following references are of record in the file of this patent:

UNITED STATES PATENTS

| Number | Name | Date |
| --- | --- | --- |
| 331,088 | Sackett | Nov. 24, 1885 |
| 601,569 | Kilgore | Mar. 29, 1898 |
| 1,457,029 | Hazlett | May 29, 1923 |
| 1,590,089 | Heath | June 22, 1926 |
| 1,605,581 | Heath | Nov. 2, 1926 |
| 1,815,006 | Horsting | July 14, 1931 |